(12) United States Patent
Wilson et al.

(10) Patent No.: US 8,848,776 B1
(45) Date of Patent: Sep. 30, 2014

(54) SYSTEMS AND METHODS FOR MULTI-DIMENSIONAL SIGNAL EQUALIZATION

(71) Applicant: LSI Corporation, San Jose, CA (US)

(72) Inventors: Bruce Wilson, San Jose, CA (US); George Mathew, San Jose, CA (US); Jongseung Park, Allentown, PA (US)

(73) Assignee: LSI Corporation, San Jose, CA (US)

( * ) Notice: Subject to any disclaimer, the term of this patent is extended or adjusted under 35 U.S.C. 154(b) by 14 days.

(21) Appl. No.: 13/853,695

(22) Filed: Mar. 29, 2013

Related U.S. Application Data

(60) Provisional application No. 61/804,997, filed on Mar. 25, 2013.

(51) Int. Cl.
*H03H 7/30* (2006.01)
*H04L 27/01* (2006.01)

(52) U.S. Cl.
CPC .................................... *H04L 27/01* (2013.01)
USPC ......................................................... 375/232

(58) Field of Classification Search
CPC ................. H04L 25/03038; H04L 25/03057; H04L 27/01
USPC ......................................................... 375/232
See application file for complete search history.

(56) References Cited

U.S. PATENT DOCUMENTS

| | | | |
|---|---|---|---|
| 5,262,904 A | 11/1993 | Tang | |
| 5,357,520 A | 10/1994 | Arnett | |
| 5,493,454 A | 2/1996 | Ziperovich | |
| 5,517,146 A | 5/1996 | Yamasaki | |
| 5,583,705 A | 12/1996 | Ziperovich | |
| 5,781,358 A | 7/1998 | Hasegawa | |
| 5,872,664 A | 2/1999 | Meier | |
| 5,986,830 A | 11/1999 | Hein | |
| 5,999,355 A | 12/1999 | Behrens | |
| 6,043,942 A | 3/2000 | Cunningham | |
| 6,091,560 A | 7/2000 | Du | |
| 6,130,794 A | 10/2000 | Christensen | |
| 6,134,691 A | 10/2000 | Hirasaka | |
| 6,141,168 A | 10/2000 | Takahashi | |
| 6,147,828 A | 11/2000 | Bloodworth | |
| 6,181,505 B1 | 1/2001 | Sacks | |
| 6,208,477 B1 | 3/2001 | Cloke | |
| 6,208,481 B1 | 3/2001 | Spurbeck | |
| 6,212,024 B1 | 4/2001 | Igarashi | |
| 6,243,031 B1 | 6/2001 | Jusuf | |

(Continued)

FOREIGN PATENT DOCUMENTS

| | | |
|---|---|---|
| DE | 10127447 | 10/2002 |
| GB | 2 320 866 | 6/1997 |

OTHER PUBLICATIONS

Wilson, "Multi-dimensional equalization for adjacent channel interference" ICC '91, IEEE International Conference on Communications, 1991, Publication Year: 1991, pp. 1398-1402 vol. 3.*

(Continued)

*Primary Examiner* — Juan A Torres
(74) *Attorney, Agent, or Firm* — Hamilton DeSanctis & Cha

(57) ABSTRACT

Embodiments are related to systems and methods for data processing, and more particularly to systems and methods for equalizing a data signal.

21 Claims, 6 Drawing Sheets

(56) References Cited

U.S. PATENT DOCUMENTS

| | | |
|---|---|---|
| 6,246,723 B1 | 6/2001 | Bliss |
| 6,337,778 B1 | 1/2002 | Gagne |
| 6,396,651 B1 | 5/2002 | Grover |
| 6,404,572 B1 | 6/2002 | Hong |
| 6,411,253 B1* | 6/2002 | Cox et al. ............... 342/194 |
| 6,535,345 B1 | 3/2003 | Shimoda |
| 6,563,655 B1 | 5/2003 | Yamasaki |
| 6,621,648 B2 | 9/2003 | Elliott |
| 6,662,303 B1 | 12/2003 | Toosky |
| 6,671,244 B2 | 12/2003 | Honma |
| 6,674,590 B2 | 1/2004 | Ottesen |
| 6,678,230 B2 | 1/2004 | Miyashita |
| 6,721,114 B1 | 4/2004 | Sutardja |
| 6,734,920 B2* | 5/2004 | Ghosh et al. ............ 348/614 |
| 6,788,481 B2 | 9/2004 | Fang |
| 6,831,797 B2 | 12/2004 | Koller |
| 6,894,854 B1 | 5/2005 | Carlson |
| 6,912,682 B1 | 6/2005 | Aoki |
| 6,934,100 B2 | 8/2005 | Ueno |
| 6,937,415 B2 | 8/2005 | Galbraith |
| 7,012,772 B1 | 3/2006 | Vis |
| 7,079,342 B1 | 7/2006 | Han |
| 7,092,179 B2 | 8/2006 | Yamanouchi |
| 7,092,180 B2 | 8/2006 | Franck |
| 7,123,429 B2 | 10/2006 | Musungu |
| 7,126,773 B1 | 10/2006 | Taratorin |
| 7,139,143 B2 | 11/2006 | Tsunoda |
| 7,158,324 B2 | 1/2007 | Stein |
| 7,170,704 B2 | 1/2007 | DeGroat |
| 7,193,802 B2 | 3/2007 | Cideciyan |
| 7,248,424 B2 | 7/2007 | Ueno |
| 7,256,954 B2 | 8/2007 | Serizawa |
| 7,262,928 B1 | 8/2007 | Oberg |
| 7,271,753 B1 | 9/2007 | Padukone |
| 7,277,376 B2 | 10/2007 | Horie |
| 7,305,027 B2 | 12/2007 | Chang |
| 7,308,057 B1 | 12/2007 | Patapoutian |
| 7,310,286 B1* | 12/2007 | Jarvis et al. ............ 367/134 |
| 7,424,077 B2 | 9/2008 | Yang |
| 7,426,236 B1 | 9/2008 | He |
| 7,440,224 B2 | 10/2008 | Ehrlich |
| 7,460,323 B2 | 12/2008 | Lee |
| 7,480,110 B2 | 1/2009 | Brittenham |
| 7,495,854 B2 | 2/2009 | Hutchins |
| 7,529,320 B2 | 5/2009 | Byrne |
| 7,542,227 B2 | 6/2009 | Che |
| 7,580,455 B2* | 8/2009 | Endres et al. ............ 375/233 |
| 7,589,924 B2 | 9/2009 | Yoshizawa |
| 7,606,300 B2 | 10/2009 | Lim |
| 7,643,238 B2 | 1/2010 | DeGroa |
| 7,696,838 B2 | 4/2010 | Wada et al. |
| 7,715,135 B1 | 5/2010 | Sutardja |
| 7,733,591 B2 | 6/2010 | Bottemiller |
| 7,859,780 B2 | 12/2010 | Mathew |
| 7,872,821 B2 | 1/2011 | Grundvig |
| 7,872,823 B2 | 1/2011 | Liu |
| 7,924,518 B2 | 4/2011 | Mathew |
| 7,924,523 B2* | 4/2011 | Mathew et al. ............ 360/65 |
| 7,929,240 B2* | 4/2011 | Mathew et al. ............ 360/66 |
| 7,929,597 B2 | 4/2011 | Mergen |
| 7,936,655 B2 | 5/2011 | Hong |
| 7,948,699 B2* | 5/2011 | Liu et al. ................ 360/39 |
| 7,948,702 B2 | 5/2011 | Mueller |
| 7,957,251 B2 | 6/2011 | Ratnakar Aravind |
| 7,965,467 B2* | 6/2011 | Mueller .................. 360/65 |
| 7,969,337 B2* | 6/2011 | Ratnakar Aravind et al. ................. 341/123 |
| 7,974,030 B2* | 7/2011 | Mathew et al. ............ 360/39 |
| 8,139,305 B2* | 3/2012 | Mathew et al. ............ 360/65 |
| 8,154,815 B2 | 4/2012 | Mueller |
| 8,175,201 B2 | 5/2012 | Mathew |
| 8,565,297 B2* | 10/2013 | Carrer et al. ............ 375/233 |
| 2003/0088834 A1 | 5/2003 | Murakami |
| 2005/0169415 A1 | 8/2005 | Nayak |
| 2007/0140088 A1 | 6/2007 | Hino |
| 2007/0236270 A1 | 10/2007 | Chiang |
| 2007/0260623 A1 | 11/2007 | Jaquette |
| 2008/0032652 A1 | 2/2008 | Zhao |
| 2008/0049825 A1 | 2/2008 | Chen |
| 2010/0053793 A1* | 3/2010 | Mathew et al. ............ 360/39 |
| 2010/0067621 A1 | 3/2010 | Noeldner |
| 2010/0067628 A1 | 3/2010 | Buehner |
| 2010/0088357 A1 | 4/2010 | Mathew |
| 2010/0287420 A1* | 11/2010 | Mathew et al. ............ 714/48 |
| 2011/0093517 A1 | 4/2011 | Liu |
| 2011/0164669 A1 | 7/2011 | Mathew |
| 2012/0019946 A1 | 1/2012 | Aravind |
| 2012/0089657 A1 | 4/2012 | Yang |

OTHER PUBLICATIONS

Barry J. et al "Iterative Timing Recovery" IEEE Signal Processing Magazine vol. 21, No. 1, Jan. 1, 2004.

Cho and Lee, "An Estimation Technique for Nonlinear Distortion in High Density Magnetic Recording Channels", IEEE Transactions on Magnetics, vol. 34, No. 1, pp. 40-44 Jan. 1998.

Degroat et al., "Experimental Characterization of Media Noise Based on Equalized Synchronized Drive Data", IEEE Trans. Magnetics, vol. 37, No. 2, pp. 633-638, Mar. 2001.

Farhang-Boroujeny, Adaptive Filters: Theory and Applications. John Wiley & Sons Ltd, 1998, Chapter 11. pp. 373-379.

Kavcic and Patapoutian, "A Signal-Dependent Autoregressive Channel Model", IEEE Trans. Magnetics, vol. 35 No. 5, pp. 2316-2318, Sep. 1999.

Lin et al. "An estimation technique for accurately modelling the magnetic recording channel including nonlinearities." IEEE Trans. Mag, vol. 25, No. 5, pp. 4084-4086, Sep. 1989.

Moon, J., "Signal-to-Noise Ratio Definition for Magnetic Recording Channels With Transition Noise", IEEE Trans. Magnetics, vol. 36, No. 5, pp. 3881-3883, Sep. 2000.

Palmer et al, "Identification of nonlinear write effects using pseudorandom sequences" IEEE Trans. Magnetics, vol. 23 No. 5, pp. 2377-2379, Sep. 1987.

Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.

Tokumasu et al. "A New Reduced Clock-Swing Flip-Flop (NDKFF)," Corporate Research & Development Center, Toshiba Corporation. IEEE Feb. 2002 Custom Intergrated Circuits Conf pp. 129-132.

U.S. Appl. No. 13/800,370, Unpublished (filed Mar. 13, 2013) (Jiangzhong Huang).

U.S. Appl. No. 13/180,311, Unpublished (filed Jul. 11, 2011) (Weijun Tan).

U.S. Appl. No. 13/100,063, Unpublished (filed May 3, 2011) (Ming Jin).

Wood and Donaldson, "The Helical-Scan Magnetic Tape Recorder as a Digital Communication Channel", IEEE Transactions on Magnetics, vol. MAG-15, No. 2, pp. 935-943 Mar. 1979.

\* cited by examiner

SYSTEMS AND METHODS FOR MULTI-DIMENSIONAL SIGNAL EQUALIZATION

CROSS REFERENCE TO RELATED APPLICATION

The present application claims priority to U.S. Pat. App. No. 61/804,997 entitled "Systems and Methods for Multi-Dimensional Signal Equalization" and filed on Mar. 25, 2013 by Wilson et al. The entirety of each of the aforementioned reference is incorporated herein by reference for all purposes.

FIELD OF THE INVENTION

Embodiments are related to systems and methods for data processing, and more particularly to systems and methods for equalizing a data signal.

BACKGROUND

Various storage access systems have been developed that include an ability to sense data previously stored on a storage medium. Such storage access systems generally include circuitry and/or software used to process a sensed signal from a storage medium, and to process the sensed data in an attempt to recover an originally written data set difficult. In some cases, the sensed data exhibits a low signal to noise ratio making recovery of the originally written data set difficult. In such situations, the information on the storage medium may be re-sensed and the process repeated. In some cases, such re-sensing and reprocessing does not result in recovery of the originally written data set.

Hence, for at least the aforementioned reasons, there exists a need in the art for advanced systems and methods for data processing.

SUMMARY

Embodiments are related to systems and methods for data processing, and more particularly to systems and methods for equalizing a data signal.

Some embodiments of the present invention provide methods for data processing that include: receiving a data set; equalizing the data set using a first equalizer circuit to yield a first equalized output; equalizing a first update data set using a second equalizer circuit to yield a second equalized output; adding the first equalized output to the second equalized output to yield a second update data set; and storing the second update data set to an update buffer.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
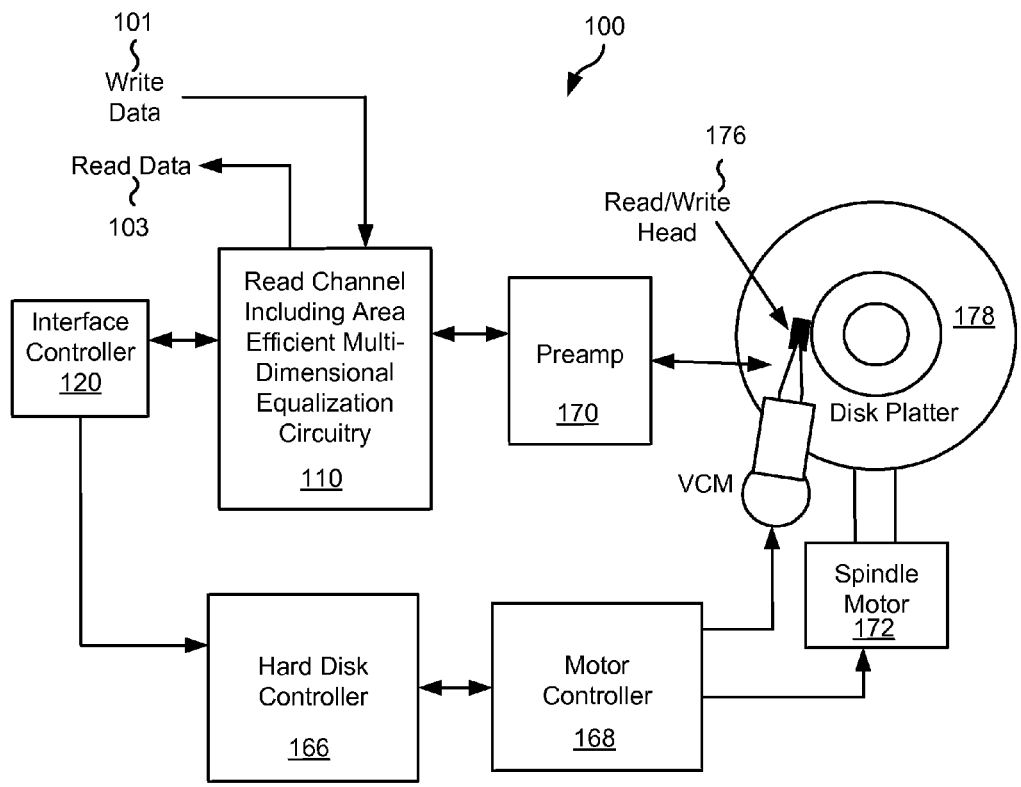
FIG. 1 shows a storage system including area efficient multi-dimensional equalization circuitry in accordance with various embodiments of the present invention.

Embodiments are related to systems and methods for data processing, and more particularly to systems and methods for equalizing a data signal.

Various embodiments of the present invention provide multi-dimensional equalization systems, circuits and methods. Such systems, circuits and methods may be used, but are not limited to, reprocessing data sets retrieved from a storage medium. Such multi-dimensional equalization systems, circuits and methods equalize one or more data sets to yield a first dimension equalized output, and stores the first dimension equalized output to a buffer. The first dimension equalized output is re-equalized to yield a second dimension equalized output. Two or more of second dimension equalized outputs are aggregated to yield an output equalized output.

Some embodiments of the present invention provide methods for data processing that include: receiving a data set; equalizing the data set using a first equalizer circuit to yield a first equalized output; equalizing a first update data set using a second equalizer circuit to yield a second equalized output; adding the first equalized output to the second equalized output to yield a second update data set; and storing the second update data set to an update buffer.

In some instances of the aforementioned embodiments, the first equalizer circuit and the second equalizer circuit are tuned such that the first equalized output is equally weighted with the second equalized output in the second update data set. In various instances of the aforementioned embodiments, the data set is a first data set, and the method further includes: receiving a second data set; equalizing the second data set using the first equalizer circuit to yield a third equalized output; equalizing the second update data set using the second equalizer circuit to yield a fourth equalized output; adding the third equalized output to the fourth equalized output to yield a third update data set; and storing the third update data set over the first update data set to the update buffer. In some such instances, the first equalizer circuit and the second equalizer circuit are tuned such that the third equalized output is equally weighted with the fourth equalized output in the third update data set. In one or more instances of the aforementioned embodiments, the methods further include: receiving a data input, and equalizing the data input using a third equalizer circuit to yield the data set. In some cases, the first equalizer circuit is a first digital finite impulse response circuit, the second equalizer circuit is a second digital finite impulse response circuit, and the third equalizer circuit is a third digital finite impulse response circuit. In some such cases, the first digital finite impulse response circuit and the second digital finite impulse response circuit are each shorter than the third digital finite impulse response circuit. In various instances of the aforementioned embodiments, the methods further include applying a data processing algorithm to the third update data set to recover an original data set encoded in the first data set.

Other embodiments of the present invention provide data processing systems that include: a first equalizer circuit, an update buffer circuit, a second equalizer circuit, and a summation circuit. The first equalizer circuit is operable to equalize a data set to yield a first equalized output. The update buffer is operable to maintain a first update data set. The second equalizer circuit is operable to equalize the first update data set to yield a second equalized output. The summation circuit is operable to add the first equalized output to the second equalized output to yield a second update data set, and to store the second update data set to the update buffer in place of the first update data set. In some instances of the aforementioned embodiments, the systems are implemented as an integrated circuit.

In one or more instances of the aforementioned embodiments, the first equalizer circuit and the second equalizer circuit are tuned such that the first equalized output is equally weighted with the second equalized output in the second update data set. In various instances of the aforementioned embodiments where the data set is a first data set, the first equalizer circuit may be further operable to equalize a second data set to yield a third equalized output; the second equalizer circuit may be further operable to equalize the second update data set to yield a fourth equalized output; and the summation circuit may be further operable to add the third equalized output to the fourth equalized output to yield a third update data set, and to store the third update data set to the update buffer in place of the second update data set. In some such instances, the first equalizer circuit and the second equalizer circuit are tuned such that the third equalized output is equally weighted with the fourth equalized output in the third update data set.

In some instances of the aforementioned embodiments, the systems further include a third equalizer circuit operable to equalize a data input to yield the data set. In some such instances, the first equalizer circuit is a first digital finite impulse response circuit, the second equalizer circuit is a second digital finite impulse response circuit, and the third equalizer circuit is a third digital finite impulse response circuit. In some particular cases, first digital finite impulse response circuit and the second digital finite impulse response circuit are each shorter than the third digital finite impulse response circuit.

In one or more instances of the aforementioned embodiments where the system is implemented as part of a storage device having a storage medium, the first data set may be derived from a track on the storage medium read at a first offset location, and the second data set may be derived from the same track on the storage medium read at a second offset location.

Yet other embodiments of the present invention provide data processing systems that include: a first equalizer circuit operable to equalize a first data set to yield a first equalized output, and to equalize a second data set to yield a second equalized output; a second equalizer circuit operable to re-equalize the first equalized output to yield a first re-equalized output; a third equalizer circuit operable to re-equalize the second equalized output to yield a second re-equalized output; and a summation circuit operable to add the first re-equalized output and the second re-equalized output to yield an overall equalized output. In some cases, the systems further include a buffer operable to store both the first equalized output and the second re-equalized output.

Turning to FIG. 1, a storage system 100 including a read channel circuit 110 having area efficient multi-dimensional equalization circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In some cases, processing data read from disk platter 178 fails due to a low signal to noise ratio of the received data. This low signal to noise ratio may be due to, for example, failure to center read/write head assembly 176 over the center of a data track. Such off-center positioning can result in a diminution of signal provided to preamplifier circuit 170. One of ordinary skill in the art will recognize other causes of low signal to noise ratio in a received signal. To address this, a retry mode may be selected where disk platter 178 is read multiple times and averaging the signals received from the various reads of disk platter 178. This averaged signal set is then re-processed to recover an originally written data set. The averaging function is implemented using an area efficient multi-dimensional equalizer circuit. In some cases, read channel circuit 110 may include circuitry similar to that discussed in relation to FIG. 2. In various cases, the area efficient multi-dimensional equalizer circuit may be implemented similar to that discussed below in relation to one of FIGS. 5*a*-5*b*, or 7*a*-7*b*; and the data processing including area efficient multi-dimensional equalization may be implemented similar to that discussed below in relation to FIG. 6.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
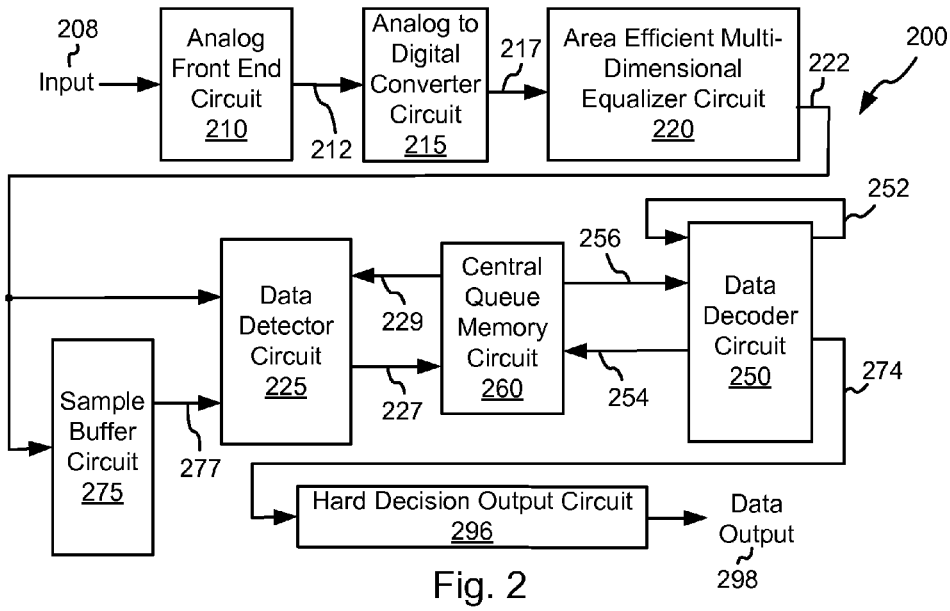
FIG. 2 shows a data processing circuit including an area efficient multi-dimensional equalization circuit in accordance with some embodiments of the present invention.

Turning to FIG. 2, a data processing circuit 200 is shown that includes an area efficient multi-dimensional equalization circuit 220 in accordance with some embodiments of the present invention. Data processing circuit 200 includes an analog front end circuit 210 that receives an analog signal 208. Analog front end circuit 210 processes analog signal 208 and provides a processed analog signal 212 to an analog to digital converter circuit 215. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog input signal 208 is derived from a read/write head assembly (not shown) that is disposed in relation to a storage medium (not shown). In other cases, analog input signal 208 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 208 may be derived.

Analog to digital converter circuit 215 converts processed analog signal 212 into a corresponding series of digital samples 217. Analog to digital converter circuit 215 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Digital samples 217 are provided to area efficient multi-dimensional equalizer circuit 220. Multi-dimensional equalizer circuit 220 applies a first dimension equalization to at least a first set of digital samples 217 corresponding to a first instance of input 208 and a second set of digital samples 217 corresponding to a second instance of input 208. The first instance of input 208 may be derived from reading a storage medium at a first offset from a track being read, and the second instance of input 208 may be derived from reading a storage medium at a second offset from the same track. Based upon the disclosure provided herein, one of ordinary skill in the art will recognize a variety of sources of the first instance and the second instance of input 208. Application of the first dimension equalization to the first data set yields a first instance, first dimensional equalization. Similarly, application of the first dimension equalization to the second data set yields a second instance, first dimensional equalization.

Multi-dimensional equalizer circuit 220 then applies a second dimension equalization to both the first instance, first dimensional equalization and the second instance, first dimensional equalization to yield an overall equalized output 222. Overall equalized output 222 combines the first set of digital samples 217 and the second set of digital samples 217 in an effort to increase the signal to noise ratio in overall equalized output 222. In some cases, both the first set and the second set are weighted equally in overall equalized output 222. In other cases, the first set is more heavily weighted in overall equalized output 222 than the second set. The weighting between the first set and the second set can be controlled by coefficients used in applying the second dimension equalization. In some embodiments of the present invention, one of both of the second dimension equalization and the first dimension equalization are done using one or more digital finite impulse response (DFIR) circuits.

Overall equalized output 222 is provided to both a data detector circuit 225 and a sample buffer circuit 275. Sample buffer circuit 275 includes sufficient memory to maintain one or more codewords until processing of that codeword is completed through data detector circuit 225 and a data decoder circuit 250 including, where warranted, multiple "global iterations" defined as passes through both data detector circuit 225 and data decoder circuit 250 and/or "local iterations" defined as passes through data decoding circuit 250 during a given global iteration. Sample buffer circuit 275 stores the received data as buffered data 277.

Data detector circuit 225 is a data detector circuit capable of producing a detected output 227 by applying a data detection algorithm to a data input. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 225 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 227 is provided to a central queue memory circuit 260 that operates to buffer data passed between data detector circuit 225 and data decoder circuit 250. When data decoder circuit 250 is available, data decoder circuit 250 receives detected output 227 from central queue memory 260 as a decoder input 256. Data decoder circuit 250 applies a data decoding algorithm to decoder input 256 in an attempt to recover originally written data. The result of the data decoding algorithm is provided as a decoded output 254. Similar to detected output 227, decoded output 254 may include both hard decisions and soft decisions. For example, data decoder circuit 250 may be any data decoder circuit known in the art that is capable of applying a decoding algorithm to a received input. Data decoder circuit 250 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 250 provides the result of the data decoding algorithm as a data output 274. Data output 274 is provided to a hard decision output circuit 296 where the data is reordered before providing a series of ordered data sets as a data output 298.

One or more iterations through the combination of data detector circuit 225 and data decoder circuit 250 may be made in an effort to converge on the originally written data set. As mentioned above, processing through both the data detector circuit and the data decoder circuit is referred to as a "global iteration". For the first global iteration, data detector circuit 225 applies the data detection algorithm without guidance from a decoded output. For subsequent global iterations, data detector circuit 225 applies the data detection algorithm to buffered data 277 as guided by decoded output 254. Decoded output 254 is received from central queue memory 260 as a detector input 229.

During each global iteration it is possible for data decoder circuit 250 to make one or more local iterations including application of the data decoding algorithm to decoder input 256. For the first local iteration, data decoder circuit 250 applies the data decoder algorithm without guidance from a decoded output 252. For subsequent local iterations, data decoder circuit 250 applies the data decoding algorithm to decoder input 256 as guided by a previous decoded output 252. In some embodiments of the present invention, a default of ten local iterations is allowed for each global iteration.

Figure 3A:
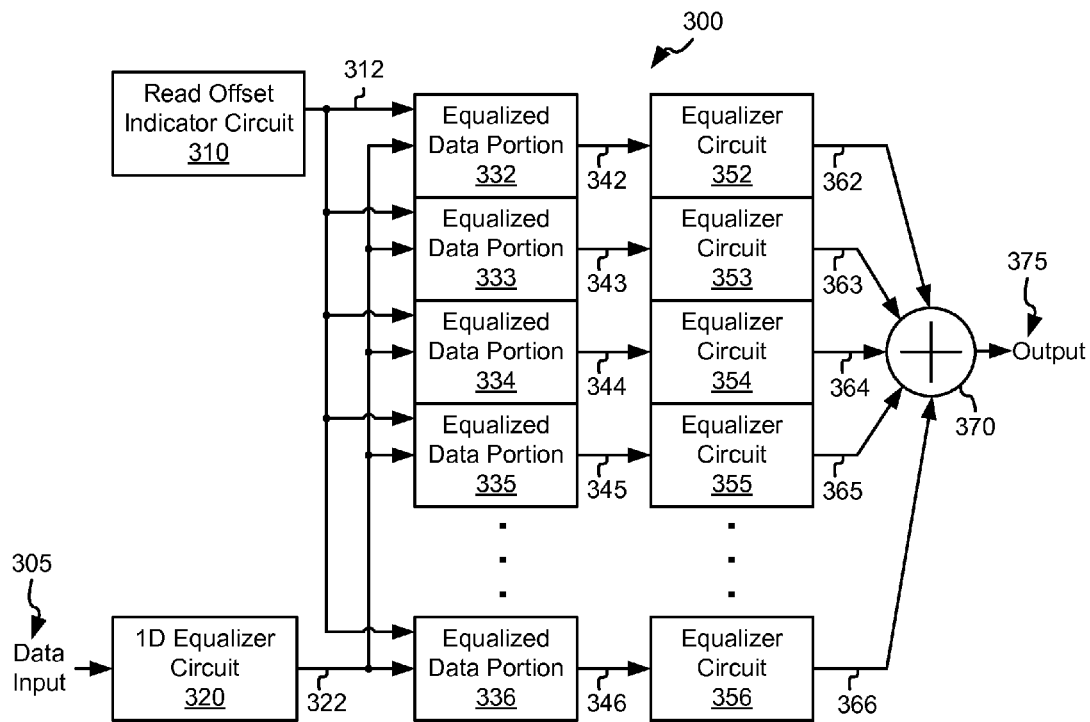
FIGS. 3a-3b shows one implementation of a two-dimensional circuit.

Turning to FIG. 3a, one implementation of a two-dimensional equalization circuit 300 is shown. Two-dimensional equalization circuit 300 includes a first dimensional equalizer circuit 320 that applies a first dimension equalization to data input 305 to yield a first dimension equalized output 322. In some embodiments of the present invention, first dimensional equalizer circuit 320 is a DFIR circuit.

Two-dimensional equalization circuit 300 is operable to apply the first dimensional equalization by first dimensional equalizer circuit 320 to a number of instances of data input 305. Each of the instances of data input 305 are derived by reading a storage medium at different offsets from the center of a track being read. As each instance of data input 305 is received, a read offset indicator circuit 310 provides an address output 312 corresponding to the offset of the track being read. Address output 312 is provided to a number of buffers 332, 333, 334, 335, 336. Each of buffers 332, 333, 334, 335, 336 is operable to store a respective instance of first dimension equalized output 322 indicated by address output 312. As such, buffer 332 stores an equalized data portion corresponding to a first offset, buffer 333 stores an equalized data portion corresponding to a second offset, buffer 334 stores an equalized data portion corresponding to a third offset, buffer 335 stores an equalized data portion corresponding to a fourth offset, and buffer 336 stores an equalized data portion corresponding to a sixth offset. It should be noted that while six buffers are shown, more or fewer may be used depending upon the number of offsets used by the embodiment.

Figure 3B:
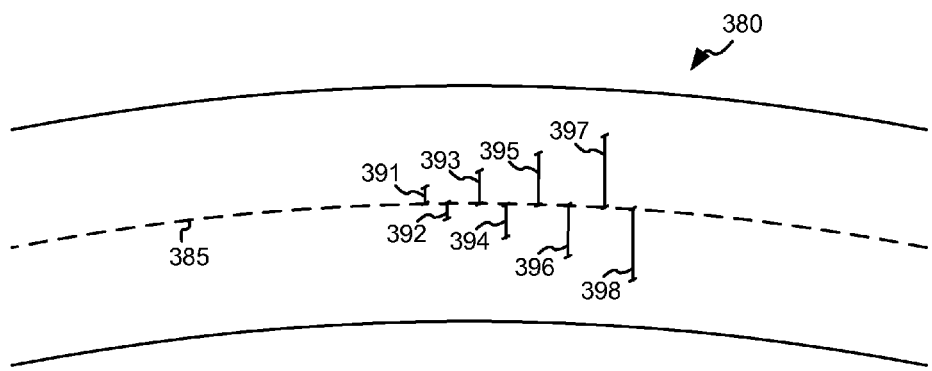

Turing to FIG. 3b, an example track 380 is represented and used to describe the source of different instances of data input 305. Example track 380 stores data that may be recovered using two-dimensional equalization circuit 300. A number of instances of data input 305 are derived by reading example track 380 at different offsets 391, 392, 393, 394, 395, 396, 397, 398 from a track center 385. Thus, reading example track 380 by placing a read head over the track at offset 391 yields a first instance of data input 305, reading example track 380 by placing a read head over the track at offset 392 yields a second instance of data input 305, reading example track 380 by placing a read head over the track at offset 393 yields a third instance of data input 305, reading example track 380 by placing a read head over the track at offset 394 yields a fourth instance of data input 305, reading example track 380 by placing a read head over the track at offset 395 yields a fifth instance of data input 305, reading example track 380 by placing a read head over the track at offset 396 yields a sixth instance of data input 305, reading example track 380 by placing a read head over the track at offset 397 yields a seventh instance of data input 305, and reading example track 380 by placing a read head over the track at offset 398 yields an eighth instance of data input 305.

Returning to FIG. 3a, after all of the instances of data input 305 have been received and corresponding instances of first dimension equalized output 322 stored to a respective one of buffers 332, 333, 334, 335, 336, the buffered first dimension equalized outputs 322 are provided to respective equalizer circuits 352, 353, 354, 355, 356. In particular, a buffered first dimension output 342 corresponding to a first instance of first dimension equalized output 322 is provided to an equalizer circuit 352 that applies a second dimension equalization to yield a first instance, second dimension equalized output 362; a buffered first dimension output 343 corresponding to a second instance of first dimension equalized output 322 is provided to an equalizer circuit 353 that applies a second dimension equalization to yield a second instance, second dimension equalized output 363; a buffered first dimension output 344 corresponding to a third instance of first dimension equalized output 322 is provided to an equalizer circuit 354 that applies a second dimension equalization to yield a third instance, second dimension equalized output 364; a buffered first dimension output 345 corresponding to a fourth instance of first dimension equalized output 322 is provided to an equalizer circuit 355 that applies a second dimension equalization to yield a fourth instance, second dimension equalized output 365; and a buffered first dimension output 346 corresponding to a fifth instance of first dimension equalized output 322 is provided to an equalizer circuit 356 that applies a second dimension equalization to yield a fifth instance, second dimension equalized output 366. In some embodiments of the present invention, each of equalizer circuit 352, equalizer circuit 353, equalizer circuit 354, equalizer circuit 355, and equalizer circuit 356 are implemented as DFIR circuits. In some cases, each of equalizer circuit 352, equalizer circuit 353, equalizer circuit 354, equalizer circuit 355, and equalizer circuit 356 are governed by coefficients that result in equal weighting of each instance of first dimension equalized output 322. In other cases, each of equalizer circuit 352, equalizer circuit 353, equalizer circuit 354, equalizer circuit 355, and equalizer circuit 356 are governed by coefficients that result in unequal weighting of each instance of first dimension equalized output 322. All of first instance, second dimension equalized output 362, second instance, second dimension equalized output 363, third instance, second dimension equalized output 364, fourth instance, second dimension equalized output 365, and fifth instance, second dimension equalized output 366 are provided to a summation element 370 that aggregates the received inputs to yield output 375.

Figure 4:
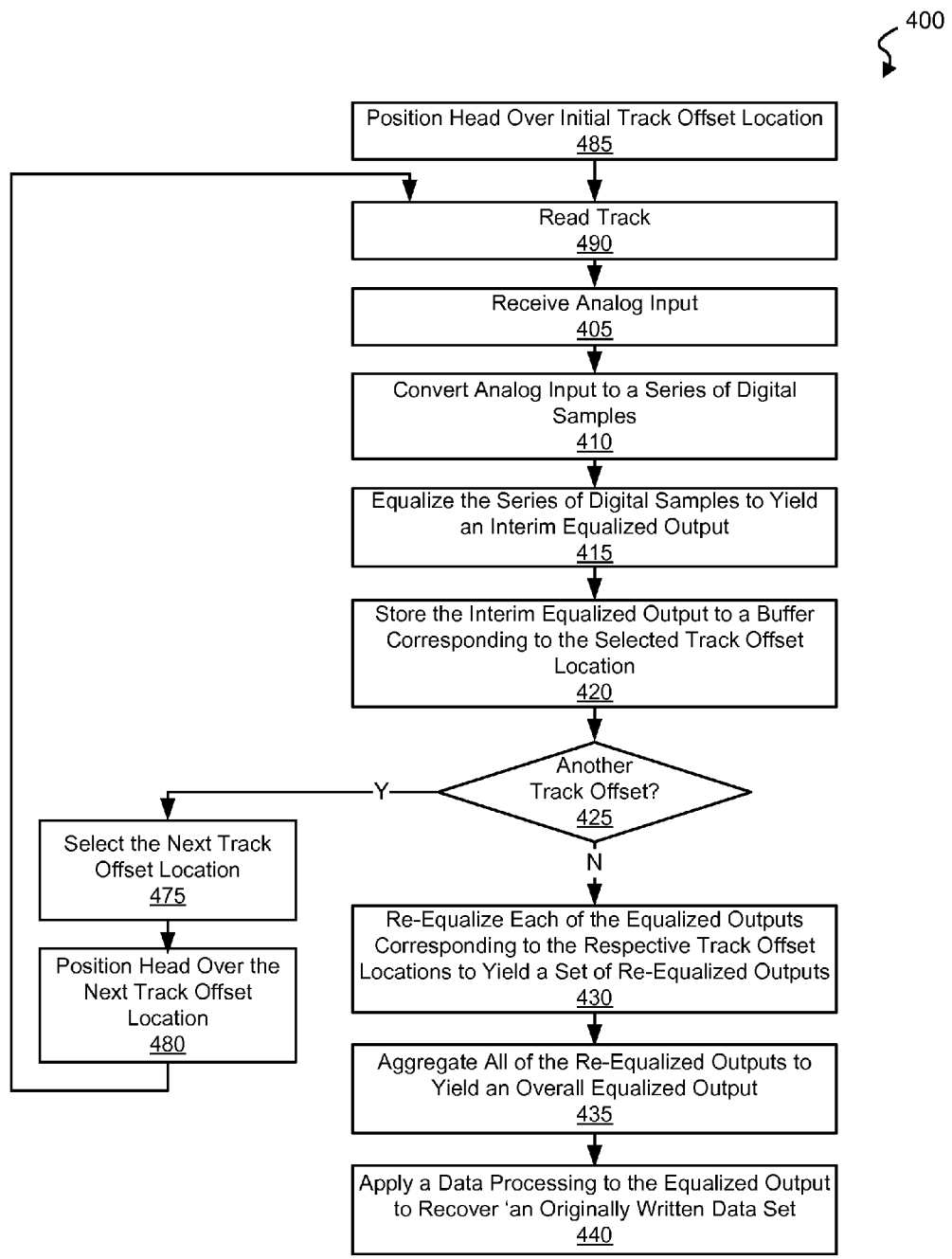
FIG. 4 is a flow diagram showing a method for retry processing in a storage device including two-dimensional equalization.

Turning to FIG. 4, a flow diagram 400 shows a method for retry processing in a storage device including two-dimensional equalization. Following flow diagram 400, a read/write head assembly is positioned at an initial track offset location (block 485), and the track is read (block 490). An analog input resulting from the reading of the track is received (block 405), and the analog input is converted to a series of corresponding digital samples (block 410).

A first dimension equalization is applied to the series of digital samples is performed to yield an interim equalized output (block 415). This first dimensional equalization may be done, for example, by using a digital finite impulse response algorithm. This interim equalized output is stored to a buffer corresponding to the selected track offset location from which the data was accessed (block 420).

It is then determined whether another track offset remains to be read (block 425). Where another track offset remains to be read (block 425), the next track offset location is selected (block 475) and the read/write head assembly is repositioned over the newly selected track offset location (block 480). The processes of blocks 490, 405, 410, 415, 420, 425 are repeated for the newly selected track offset location with the resulting interim equalized output being stored to a different buffer.

Alternatively, where no additional track offsets remain to be read (block 425), each of the interim equalized outputs is re-equalized to yield a set of re-equalized outputs (block 430). In some cases, this second dimensional equalization may be done, for example, by using a digital finite impulse response algorithm. In some cases, the second dimensional equalization results in equal weighting of each instance of interim equalized outputs, while in other cases, the second dimensional equalization results in unequal weighting of each instance of interim equalized outputs. All of the re-equalized outputs are aggregated to yield an overall equalized output (block 435). Data processing is applied to the overall equalized output to recover an originally written data set (block 440). This data processing may include, but is not limited to, application of a data detection algorithm and/or a data decode algorithm.

Figure 5A:
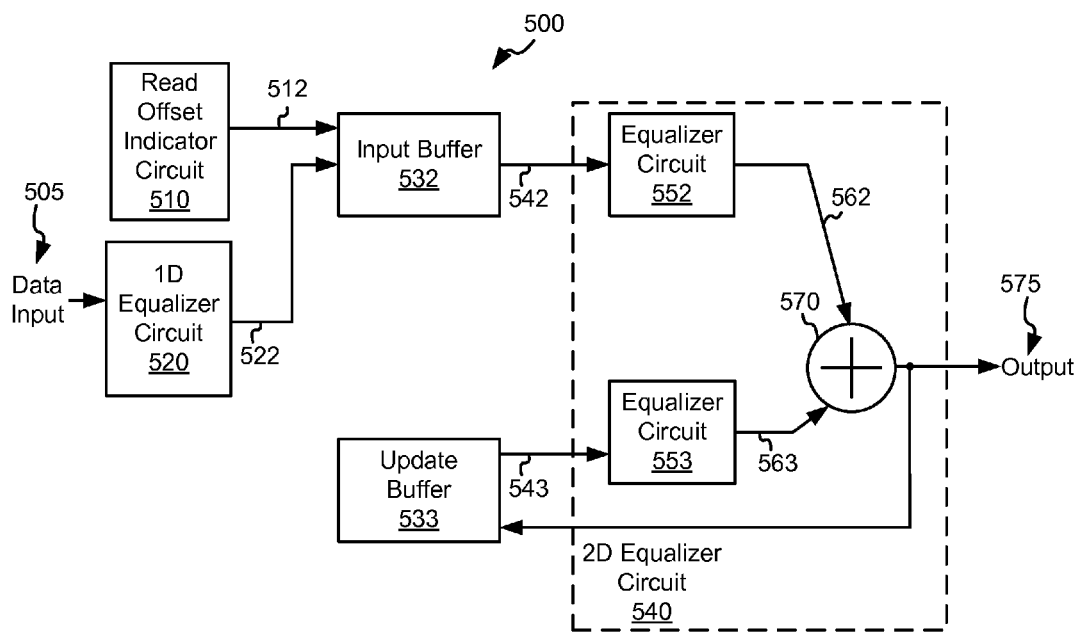
FIGS. 5a-5b shows one implementation of an area efficient multi-dimensional equalization circuit in accordance with some embodiments of the present invention.

Turning to FIG. 5a, an implementation of an area efficient multi-dimensional equalization circuit 500 is shown in accordance with one or more embodiments of the present invention. Area efficient multi-dimensional equalization circuit 500 may be used in place of area efficient multi-dimensional equalization circuit 220 of FIG. 2, where digital samples 217 are provided as a data input 505, and an output 575 is provided as overall equalized output 222.

Area efficient multi-dimensional equalization circuit 500 includes a first dimensional equalizer circuit 520 that applies a first dimension equalization to data input 505 to yield a first dimension equalized output 522. In some embodiments of the present invention, first dimensional equalizer circuit 520 is a DFIR circuit.

Area efficient multi-dimensional equalization circuit 500 is operable to apply the first dimensional equalization by first dimensional equalizer circuit 520 to a number of instances of data input 505. Each of the instances of data input 505 are derived by reading a storage medium at different offsets from the center of a track being read. As each instance of data input 505 is received, a read offset indicator circuit 510 directs the new instance of first dimension equalized output 522 to be stored to an input buffer 532 using an enable control 512. An interim equalized output 542 from input buffer 532 is provided to a second dimensional equalizer circuit 540.

Second dimensional equalizer circuit 540 includes a first equalizer circuit 552, a second equalizer circuit 553, and a summation circuit 570. Interim equalized output 542 is provided to equalizer circuit 552 where it is re-equalized to yield a first second dimension equalized output 562. First second dimension equalized output 562 is provided to a summation circuit 570 where it is added to a second second dimension equalized output 563 to yield an output 575. Output 575 is stored back to an update buffer 533 where it is maintained as an interim equalized output 543. Interim equalized output 543 is provided to equalizer circuit 553 where it is re-equalized to yield the second second dimension equalized output 563. In some embodiments of the present invention both equalizer circuit 552 and equalizer circuit 553 are shorter than equalizer circuit 520.

In operation, when interim equalized output 542 is a first instance of first dimension equalized output 522, equalizer circuit 552 is tuned to weight first second dimension equalized output 562 as one hundred percent in output 575, and equalizer circuit 553 is tuned to weight second second dimension equalized output 563 as zero percent in output 575. For later instances, equalized output 522 is combined with equalized output 562 to yield output 575. The equalization design strategy automatically comes up with the appropriate weighting which are a function of the selected read-offsets.

As another example, the second dimension equalization may be skipped for the first instance of first dimension equalized output 522 and achieve the same result. In such a case, when interim equalized output 542 is a first instance of first dimension equalized output 522, interim equalized output 542 is written directly to update buffer 533 and no second level equalization is performed. Then, when the second instance of first dimension equalized output 522 is available, it is written to input buffer 532.

Figure 5B:
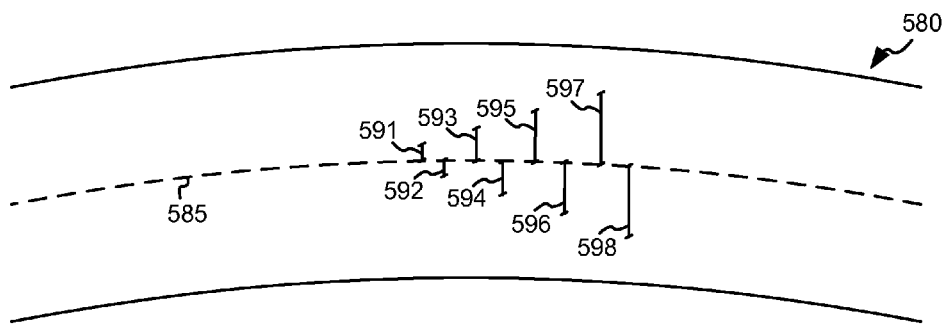

Turing to FIG. 5*b*, an example track 580 is represented and used to describe the source of different instances of data input 505. Example track 580 stores data that may be recovered using area efficient multi-dimensional equalization circuit 500. A number of instances of data input 505 are derived by reading example track 580 at different offsets 591, 592, 593, 594, 595, 596, 597, 598 from a track center 585. Thus, reading example track 580 by placing a read head over the track at offset 591 yields a first instance of data input 505, reading example track 580 by placing a read head over the track at offset 592 yields a second instance of data input 505, reading example track 580 by placing a read head over the track at offset 593 yields a third instance of data input 505, reading example track 580 by placing a read head over the track at offset 594 yields a fourth instance of data input 505, reading example track 580 by placing a read head over the track at offset 595 yields a fifth instance of data input 505, reading example track 580 by placing a read head over the track at offset 596 yields a sixth instance of data input 505, reading example track 580 by placing a read head over the track at offset 597 yields a seventh instance of data input 505, and reading example track 580 by placing a read head over the track at offset 598 yields an eighth instance of data input 505. Of note, only two equalizer circuits are required in second dimension equalizer circuit 540 regardless of the number of track offset locations that are used. This is in comparison to that discussed above in relation to FIG. 3*a* where the number of equalizer circuits required to perform the second dimension equalization is equal to the number of track offset locations that are used.

In some embodiments of the present invention, the order that reads and processing of data from the various offsets is second largest negative offset (i.e., offset 596), followed by the next largest negative offset (i.e., offset 594), followed by the corresponding positive offset (i.e., offset 593), followed by the next larger positive offset (i.e., offset 595), followed by a zero offset, followed by the largest positive offset (i.e., offset 597), and followed by the largest negative offset (i.e., offset 598). In other embodiments of the present invention, the order that reads and processing of data from the various offsets is second largest negative offset (i.e., offset 596), followed by the next largest negative offset (i.e., offset 594), followed by a zero offset, followed by the second largest positive offset (i.e., offset 595), followed by the next lower positive output (i.e., offset 593), followed by the largest negative offset (i.e., offset 598), and followed by the largest positive offset (i.e., offset 597). Based upon the disclosure provided herein, one of ordinary skill in the art will recognize a variety of orders that reads from the various offsets may be performed.

Figure 6:
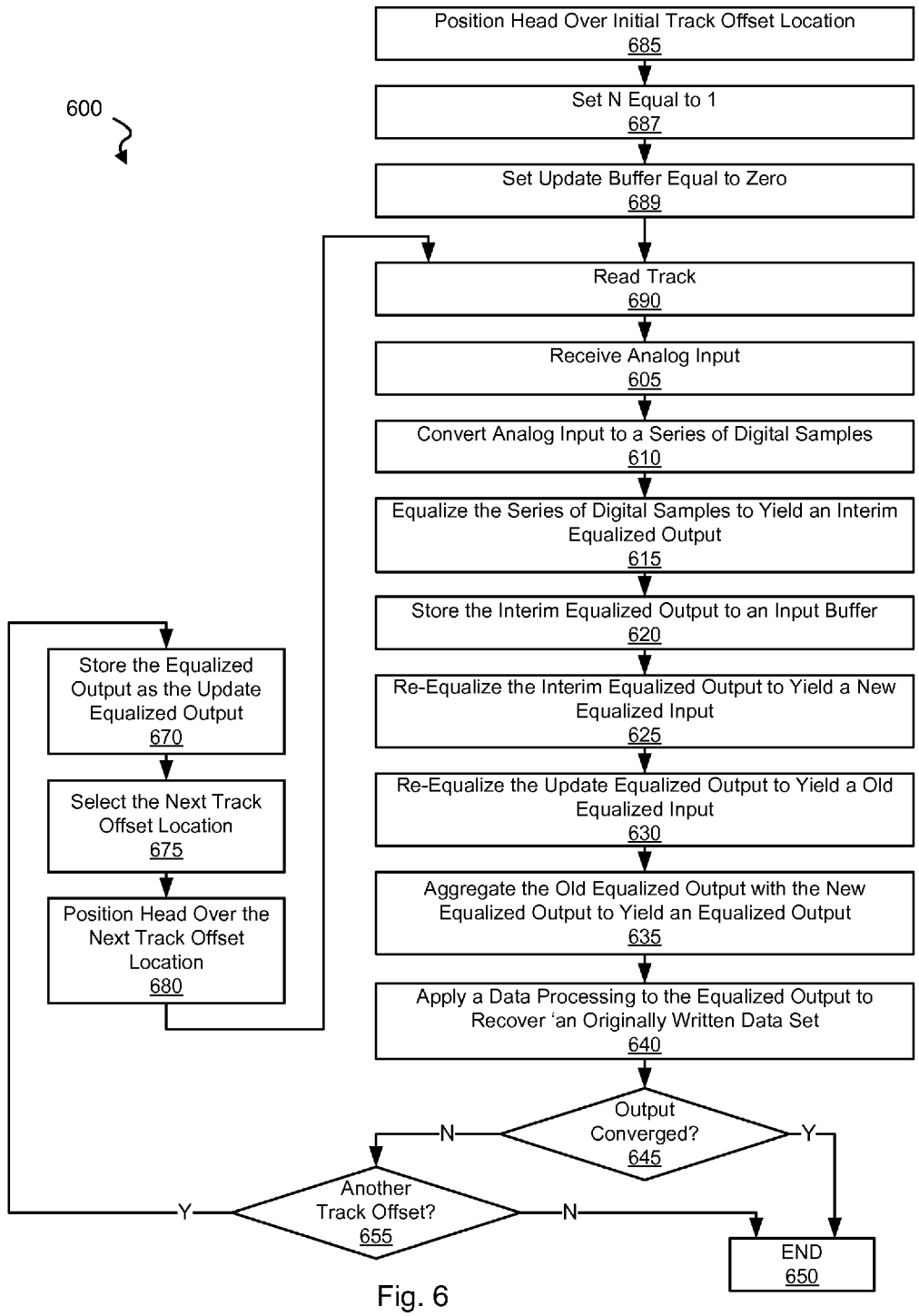
FIG. 6 is a flow diagram showing another method for retry processing in a storage device including multi-dimensional equalization in accordance with other embodiments of the present invention.

Turning to FIG. 6, a flow diagram 600 shows another method for retry processing in a storage device including multi-dimensional equalization in accordance with some embodiments of the present invention. Following flow diagram 600, a read/write head assembly is positioned at an initial track offset location (block 685), a counter value N is initialized to '1' (block 687), an update buffer is set to all zeros (block 689), and the track is read (block 690). An analog input resulting from the reading of the track is received (block 605), and the analog input is converted to a series of corresponding digital samples (block 610).

A first dimension equalization is applied to the series of digital samples is performed to yield an interim equalized output (block 615). This first dimensional equalization may be done, for example, by using a digital finite impulse response algorithm. This interim equalized output is stored to an input buffer (block 620). The interim equalized output is re-equalized to yield a new equalized output (block 625), and the update equalized output is re-equalized to yield an old equalized output (block 630). The old equalized input is added to the new equalized input to yield an equalized output (block 635).

Data processing is applied to the overall equalized output to recover an originally written data set (block 640). This data processing may include, but is not limited to, application of a data detection algorithm and/or a data decode algorithm. It is determined whether the data processing converges (i.e., yields the originally written data set) (block 645). Where the data processing converged (block 645), the process ends (block 655). Alternatively, where the data processing failed to converge (block 645), it is determined whether another track offset remains to be read (block 655). Where no other track offsets remain to be read (block 655), the process ends (block 650) without recovering the originally written data set.

Alternatively, where another track offset remains to be read (block 655), the equalized output is stored as the update equalized output in the update buffer (block 670) in preparation for use during a subsequent second dimension equalization. The next track offset location is selected (block 675) and the read/write head assembly is repositioned over the newly selected track offset location (block 680). The processes of blocks 690, 605, 610, 615, 620, 625, 630, 635, 640, 645 are repeated for the newly selected track offset location. Of note, the number of track offset locations that are actually read may vary depending upon when convergence occurs. This is in comparison to the approach discussed above in relation to FIG. 4 where all of the track offset locations are read.

Figure 7A:
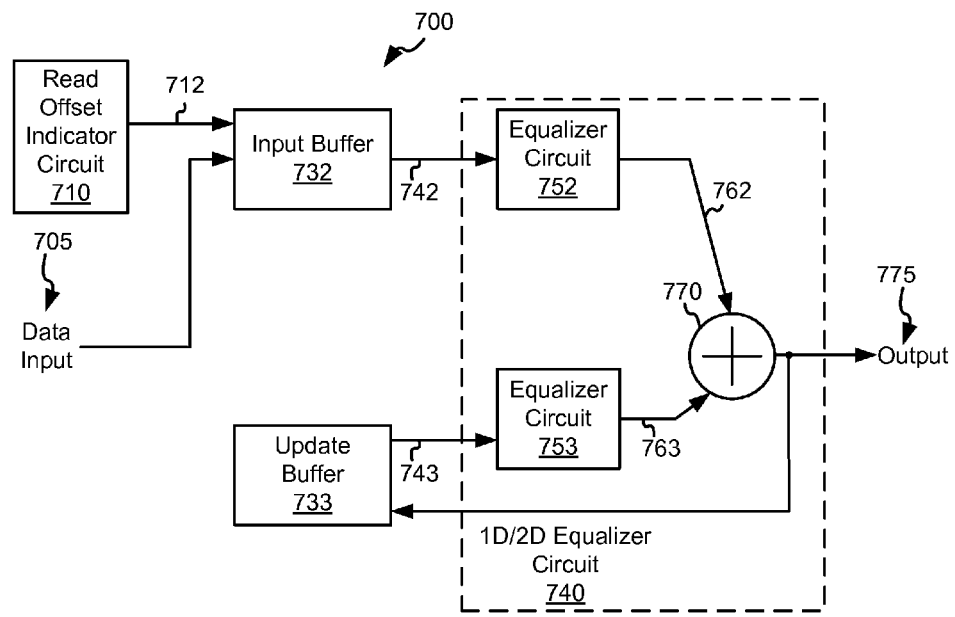
FIGS. 7a-7b shows another implementation of an area efficient multi-dimensional equalization circuit in accordance with various embodiments of the present invention.

Turning to FIG. 7*a*, another implementation of an area efficient multi-dimensional equalization circuit 700 is shown in accordance with one or more embodiments of the present invention. Area efficient multi-dimensional equalization circuit 700 may be used in place of area efficient multi-dimensional equalization circuit 220 of FIG. 2, where digital samples 217 are provided as a data input 705, and an output 775 is provided as overall equalized output 222.

Area efficient multi-dimensional equalization circuit 700 includes an input buffer 732 and an update buffer 733. As each instance of data input 705 corresponding to respective track offset locations is received, it is stored to input buffer 732 under the control of a control output 712 received from a read offset indicator circuit 710.

In addition, area efficient multi-dimensional equalization circuit 700 includes a dual purpose first dimension and second dimension equalizer circuit 740. First dimension and second dimension equalizer circuit 740 includes a first equalizer circuit 752, a second equalizer circuit 753, and a summation circuit 770. An input data set 742 is accessed from input buffer 732 and provided to equalizer circuit 752 where it is re-equalized to yield a first dimension equalized output 762. First dimension equalized output 762 is provided to a summation circuit 770 where it is added to a second dimension equalized output 763 to yield an output 775. Output 775 is stored back to an update register 733 where it is maintained as an interim equalized output 743. Interim equalized output 743 is provided to equalizer circuit 753 where it is re-equalized to yield second dimension equalized output 763.

In operation, when input data set 742 is a first instance of data input 705, equalizer circuit 752 is tuned to weight first dimension equalized output 762 as one hundred percent in output 775, and equalizer circuit 753 is tuned to weight second dimension equalized output 763 as zero percent in output 775. For later instances, equalized output 762 is combined with equalized output 762 to yield output 775. The equalization design strategy automatically comes up with the appropriate weighting which are a function of the selected read-offsets.

As another example, the second dimension equalization may be skipped for the first instance of data input 705 and achieve the same result. In such a case, when input data set 742 is a first instance of data input 705, data input 705 is written directly to update buffer 733 and no second level equalization is performed. Then, when the second instance of data input 705 is available, it is written to input buffer 732. Once this is complete, then equalizer circuit 752 is tuned to weight first dimension equalized output 762 as fifty in output 775, and equalizer circuit 753 is tuned to weight second dimension equalized output 763 as fifty percent in output 775. The process then proceeds as previously discussed. Again, it should be noted that while an equal weighting scenario is described, that an approach that applies unequal weighting is also possible in accordance with one or more embodiments of the present invention. As yet another example of skipping second dimension equalization in FIG. 7a could be as follows: the output 762 could be passed directly to output 775 as well written to buffer 733 without using 763 when 742 corresponds to the first instance of 705.

Figure 7B:
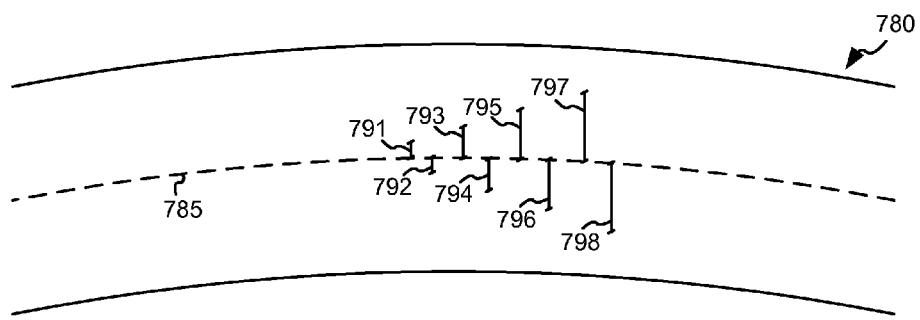

Turing to FIG. 7b, an example track 780 is represented and used to describe the source of different instances of data input 705. Example track 780 stores data that may be recovered using area efficient multi-dimensional equalization circuit 700. A number of instances of data input 705 are derived by reading example track 780 at different offsets 791, 792, 793, 794, 795, 796, 797, 798 from a track center 785. Thus, reading example track 780 by placing a read head over the track at offset 791 yields a first instance of data input 705, reading example track 780 by placing a read head over the track at offset 792 yields a second instance of data input 705, reading example track 780 by placing a read head over the track at offset 793 yields a third instance of data input 705, reading example track 780 by placing a read head over the track at offset 794 yields a fourth instance of data input 705, reading example track 780 by placing a read head over the track at offset 795 yields a fifth instance of data input 705, reading example track 780 by placing a read head over the track at offset 796 yields a sixth instance of data input 705, reading example track 780 by placing a read head over the track at offset 797 yields a seventh instance of data input 705, and reading example track 780 by placing a read head over the track at offset 798 yields an eighth instance of data input 705. Of note, only two equalizer circuits are required in second dimension equalizer circuit 740 regardless of the number of track offset locations that are used. This is in comparison to that discussed above in relation to FIG. 3a where the number of equalizer circuits required to perform the second dimension equalization is equal to the number of track offset locations that are used.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for data processing, the method comprising:
   receiving a data set;
   equalizing the data set using a first equalizer circuit to yield a first equalized output;
   equalizing a first update data set using a second equalizer circuit to yield a second equalized output;
   adding the first equalized output to the second equalized output to yield a second update data set; and
   storing the second update data set to an update buffer.

2. The method of claim 1, wherein first equalizer circuit and the second equalizer circuit are tuned such that the first equalized output is equally weighted with the second equalized output in the second update data set.

3. The method of claim 1, wherein the data set is a first data set, and wherein the method further comprises:
   receiving a second data set;
   equalizing the second data set using the first equalizer circuit to yield a third equalized output;
   equalizing the second update data set using the second equalizer circuit to yield a fourth equalized output;
   adding the third equalized output to the fourth equalized output to yield a third update data set; and
   storing the third update data set over the first update data set to the update buffer.

4. The method of claim 1, wherein the method further comprises:
   receiving a data input;
   equalizing the data input using a third equalizer circuit to yield the data set.

5. The method of claim 3, wherein first equalizer circuit and the second equalizer circuit are tuned such that the third equalized output is equally weighted with the fourth equalized output in the third update data set.

6. The method of claim 4, wherein the first equalizer circuit is a first digital finite impulse response circuit, wherein the second equalizer circuit is a second digital finite impulse response circuit, and wherein the third equalizer circuit is a third digital finite impulse response circuit.

7. The method of claim 3, wherein the method further comprises:
   applying a data processing algorithm to the third update data set to recover an original data set encoded in the first data set.

8. The method of claim 3, wherein the first data set is derived from a track on a storage medium read at a first offset location, and wherein the second data set is derived from the same track on the storage medium read at a second offset location.

9. The method of claim 6, wherein the first digital finite impulse response circuit and the second digital finite impulse response circuit are each shorter than the third digital finite impulse response circuit.

10. A data processing system, the system comprising:
- a first equalizer circuit operable to equalize a data set to yield a first equalized output;
- an update buffer operable to maintain a first update data set;
- a second equalizer circuit operable to equalize the first update data set to yield a second equalized output; and
- a summation circuit operable to add the first equalized output to the second equalized output to yield a second update data set, and to store the second update data set to the update buffer in place of the first update data set.

11. The data processing system of claim 10, wherein first equalizer circuit and the second equalizer circuit are tuned such that the first equalized output is equally weighted with the second equalized output in the second update data set.

12. The data processing system of claim 10, wherein the system further comprises:
- a third equalizer circuit operable to equalize a data input to yield the data set.

13. The data processing system of claim 10, wherein the system is implemented as an integrated circuit.

14. The data processing system of claim 11, wherein the data set is a first data set, wherein:
- the first equalizer circuit is further operable to equalize a second data set to yield a third equalized output;
- the second equalizer circuit is further operable to equalize the second update data set to yield a fourth equalized output;
- the summation circuit is further operable to add the third equalized output to the fourth equalized output to yield a third update data set, and to store the third update data set to the update buffer in place of the second update data set.

15. The data processing system of claim 12, wherein the first equalizer circuit is a first digital finite impulse response circuit, wherein the second equalizer circuit is a second digital finite impulse response circuit, and wherein the third equalizer circuit is a third digital finite impulse response circuit.

16. The data processing system of claim 14, wherein first equalizer circuit and the second equalizer circuit are tuned such that the third equalized output is equally weighted with the first equalized output in the third update data set.

17. The data processing system of claim 14, wherein the system further comprises:
- a data detector circuit operable to apply a data detection algorithm to the third update data set to yield a detected output; and
- a data decoder circuit operable to apply a data decode algorithm to a decoder input derived from the detected output to yield a decoded output.

18. The data processing system of claim 14, wherein the system is implemented as part of a storage device having a storage medium, and wherein the first data set is derived from a track on the storage medium read at a first offset location, and wherein the second data set is derived from the same track on the storage medium read at a second offset location.

19. The data processing system of claim 15, wherein the first digital finite impulse response circuit and the second digital finite impulse response circuit are each shorter than the third digital finite impulse response circuit.

20. A data processing system, the system comprising:
- a first equalizer circuit operable to equalize a first data set to yield a first equalized output, and to equalize a second data set to yield a second equalized output;
- a second equalizer circuit operable to re-equalize the first equalized output to yield a first re-equalized output;
- a third equalizer circuit operable to re-equalize the second equalized output to yield a second re-equalized output; and
- a summation circuit operable to add the first re-equalized output and the second re-equalized output to yield an overall equalized output.

21. The data processing system of claim 20, wherein the system further comprises:
- a buffer operable to store both the first equalized output and the second equalized output.

* * * * *